United States Patent
Lai et al.

(10) Patent No.: US 7,943,268 B2
(45) Date of Patent: May 17, 2011

(54) REINFORCED MEMBRANE ELECTRODE ASSEMBLY

(75) Inventors: Yeh-Hung Lai, Webster, NY (US); Daniel Miller, Victor, NY (US); Brian A. Litteer, Henrietta, NY (US); Craig S. Gittleman, Rochester, NY (US); Michael K. Budinski, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1414 days.

(21) Appl. No.: 11/242,698

(22) Filed: Oct. 4, 2005

(65) Prior Publication Data

US 2007/0077475 A1   Apr. 5, 2007

(51) Int. Cl.
*H01M 8/10* (2006.01)
*H01M 4/94* (2006.01)

(52) U.S. Cl. ........................................ 429/483; 429/508

(58) Field of Classification Search ........................ None
See application file for complete search history.

(56) References Cited

U.S. PATENT DOCUMENTS

| | | | |
|---|---|---|---|
| 2003/0008198 A1* | 1/2003 | Mukoyama et al. | 429/42 |
| 2005/0095486 A1* | 5/2005 | Hamamoto et al. | 429/33 |
| 2005/0227132 A1* | 10/2005 | Hori et al. | 429/30 |
| 2005/0260476 A1* | 11/2005 | Xie | 429/33 |
| 2006/0068258 A1* | 3/2006 | Kinoshita | 429/33 |

FOREIGN PATENT DOCUMENTS

| | | |
|---|---|---|
| JP | 6267555 A | 9/1994 |
| JP | 7296818 A | 11/1995 |
| JP | 2002367626 A | 12/2002 |
| JP | 2004193109 A | 7/2004 |

* cited by examiner

*Primary Examiner* — Dah-Wei Yuan
*Assistant Examiner* — Angela J. Martin
(74) *Attorney, Agent, or Firm* — Dinsmore & Shohl LLP

(57) ABSTRACT

The present invention is directed to addressing performance issues attributable to membrane electrode assemblies, and the components thereof, in electrochemical conversion cells. In accordance with one embodiment of the present invention, a device comprising at least one electrochemical conversion cell is provided. The cell is configured to convert first and second reactants to electrical energy and comprises a membrane electrode assembly and at least one membrane reinforcement layer. The combination of elastic modulus and thickness of the reinforcement layer and the bond between the reinforcement layer and the membrane electrode assembly are sufficient to enhance the structural integrity of the membrane electrode assembly beyond the operational degradation threshold of the assembly.

18 Claims, 4 Drawing Sheets

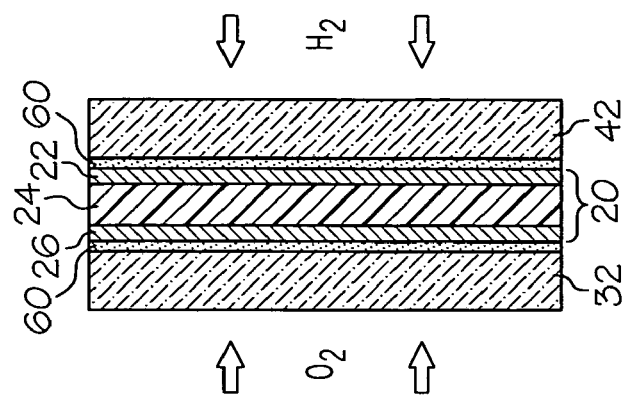
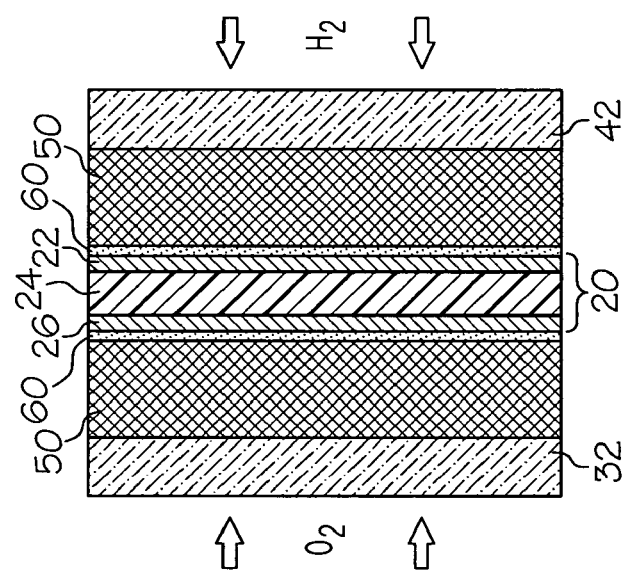
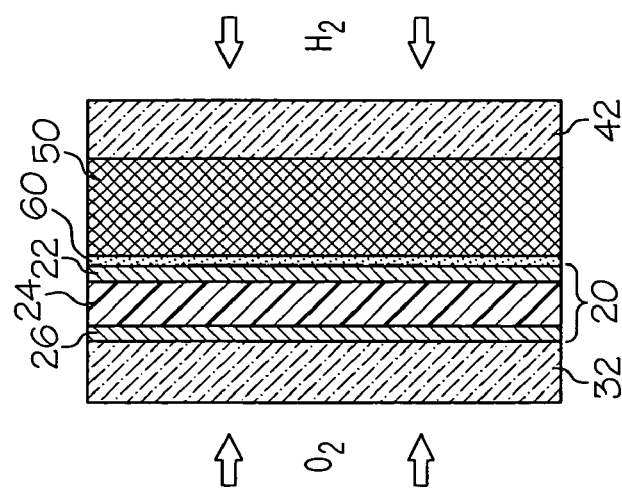

REINFORCED MEMBRANE ELECTRODE ASSEMBLY

BACKGROUND OF THE INVENTION

The present invention relates to electrochemical conversion cells, commonly referred to as fuel cells, which produce electrical energy by processing first and second reactants, e.g., through oxidation and reduction of hydrogen and oxygen. By way of illustration and not limitation, a typical cell comprises a membrane electrode assembly positioned between a pair of gas diffusion media layers. A cathode flow field plate and an anode flow field plate are positioned on opposite sides of the cell unit, adjacent the gas diffusion media layers. The voltage provided by a single cell unit is typically too small for useful application. Accordingly, a plurality of cells are typically arranged and connected consecutively in a "stack" to increase the electrical output of the electrochemical conversion assembly or fuel cell.

BRIEF SUMMARY OF THE INVENTION

The present invention is directed to addressing performance issues attributable to membrane electrode assemblies, and the components thereof, in electrochemical conversion cells. More specifically, the present invention is directed to the addition of one or more external reinforcement layers to the membrane electrode assembly (MEA) of electrochemical conversion cells. With the addition of the external reinforcement layer, the reactant gas crossover leak can be reduced by reducing crack driving force and crack open area associated with mechanical stresses induced during thermal and hydro cycling in the cell.

More specifically, the present inventors have recognized that the durability of fuel cells is generally limited by three factors: (1) the overall MEA performance degradation, (2) the service life of seals, and (3) the mechanical integrity of polymer electrolyte membranes (PEM). The last factor is significant because the membranes act as a barrier to prevent crossover of reactant gases from the anode to the cathode, or vice versa. In the extreme case, as is often observed when PEM cells reach the end of their service life, pinhole formation leads to localized heating and integrity loss in the membrane.

The present inventors have recognized that this type of membrane failure could be triggered or enhanced by local stresses from dehydration. Further, the size and number of pinholes could be reasonably related to the gas crossover rate. Typically, gas crossover rates are initially low but slowly increase over the fuel cell service life. When a fuel cell approaches the final stage of its service life, the crossover rate increases dramatically. Since the crossover rate is closely related to pinhole formation and, in turn, the pinhole formation is closely related to mechanical failure, it follows that crossover rate and membrane durability are related to crack initiation and propagation in membranes.

The present inventors have recognized that, in the first stage of fuel cell life, where the cell is characterized by a low crossover rate increase, cracks would form from many mechanisms such as the diffusion media's carbon fiber puncturing through MEA, chemical degradation, material defects from membrane manufacturing process, local stress concentration and creep rupture, etc. At this stage, cracks are usually short and barely open which leads to low crossover rate. As the membrane goes through a significant number of thermal and hydration cycles, accumulated fatigue damage in the material sets the stage for crack propagation. As cracks begin to propagate, the crack length increases and the tension pulls the crack surfaces apart allowing more gas to crossover the membrane. According to fracture mechanics theory, increased crack length leads to larger crack driving forces, which dictate faster crack growth. More rapid crack growth is accompanied by an accelerated increase in gas crossover rate, hastening membrane failure.

One object of the present invention is to reduce crack driving force and crack open area by addressing the aforementioned accelerated nature of crack growth. According to the concepts of fracture mechanics analysis, the present inventors have recognized that if one can limit the crack growth rate within the magnitude observed in the first stage of fuel cell life and therefore prevent the second stage of crack growth, the fuel cell life can be increased significantly. In addition, the present inventors have also recognized that if one can further reduce the crack open area, the gas crossover leak can be reduced and therefore the fuel cell life can be increased. Specifically in the case of a non-reinforced MEA, where the MEA includes a crack of a given length and is subjected to typical bi-axial tension, the crack would be characterized by a crack driving force of $$G = \pi a \sigma^2 / E_m$$

and a crack open area or opened pinhole size of $$A = 2\pi a^2 \sigma / E_m$$

where a is half of the crack length, $\sigma$ is the MEA bi-axial tension, and $E_m$ is the resultant elastic modulus of the MEA, where the elastic modulus of single or multiple layered material can be measured using a standard test such as ASTM D882.

Note that it is reasonable to assume that the gas crossover rate is proportional to the crack open area A. Also note that the crack driving force G is proportional to crack length while crack open area is proportional to the square of crack length. It is expected that crossover rate would accelerate significantly when the crack reaches certain size since MEA tension typically remains constant as the crack propagates and the crack velocity is proportional to the crack driving force.

According to one aspect of the present invention, the external reinforcement layer provided with the MEA would have adequate adhesion to the MEA so there is no delamination between MEA and the reinforcement layer. According to another aspect of the present invention, the reinforcement layer is selected such that its thickness is at least 50% of the MEA and the elastic modulus is at least 10% of the MEA.

Generally, membrane electrode assemblies utilizing external reinforcement layers according to the present invention are characterized by crack driving forces G that are independent of crack length a:

$$G = Zh\sigma^2 / E_m$$

where h is the MEA thickness and Z is a constant representing the relative elastic moduli of the MEA and the external reinforcement layer. For example, where the resultant elastic modulus of the MEA is less than 10 times the modulus of the reinforcement layer, Z would range from about 0.5 to about 5. Further, the crack open area A is given by:

$$A = 2ha\sigma / E_m$$

Accordingly, for membranes reinforced according to the present invention, the crack driving force G is independent of crack length while the crack open area is merely proportional to crack length a. By eliminating the dependence of crack driving force on the crack length in the present invention, one can expect to reduce the crack propagation rate. Furthermore, by making the crack open area, and therefore crossover leak, more weakly depend on the crack length, one can expect to significantly reduce the gas cross over leak rate even as the crack propagates using the present invention. One advantage of the present invention over the prior art can be further examined by the ratios of crack driving force and crack open area between the present invention and prior art (quantities of present invention divided by the prior art) as given by Crack Driving Force Ratio=$Zh/(\pi a)$; and Crack Open Area Ratio=$h/(\pi a)$;

in which equations it is clearly shown that both ratios decrease as the crack length $2a$ increases, demonstrating the increasing benefits using the present invention. The crack driving force ratio and crack open area ratio for a MEA with reinforcement layer on both sides of the MEA are shown in FIG. 6, where $E_r$ and $h_r$ are the elastic modulus and thickness of the reinforcement, respectively. It is clearly seen in this graph that for all cases as the crack propagates, both crack driving force ratio and crack open area ratio would decrease with the value eventually dropping below 1 for a crack length more than three times of the MEA thickness. This example demonstrates that the present invention not only can reduce the crack propagation rate but also the gas crossover leak rate for a reinforcement layer with an elastic modulus larger than 10% of the modulus of the MEA and a thickness larger than 50% of the thickness of the MEA.

In accordance with one embodiment of the present invention, a device comprising at least one electrochemical conversion cell is provided. The cell is configured to convert first and second reactants to electrical energy and comprises a membrane electrode assembly and at least one membrane reinforcement layer. The membrane electrode assembly defines a fracture toughness that is insufficient to preserve the structural integrity of the membrane electrode assembly beyond a given operational degradation threshold, where the fracture toughness may be assessed by tests such as ASTM D1938 or other conventional or yet to be developed tear tests. The membrane reinforcement layer defines an elastic modulus and thickness and is bonded to at least one side of the membrane electrode assembly. The elastic modulus and thickness of the reinforcement layer and the bond between the reinforcement layer and the membrane electrode assembly are sufficient to enhance the structural integrity of the membrane electrode assembly beyond the operational degradation threshold.

In accordance with another embodiment of the present invention, a device is provided comprising at least one electrochemical conversion cell configured to convert first and second reactants to electrical energy. The first reactant comprises a hydrogenous gas and the second reactant comprises oxygen. The membrane reinforcement layer is bonded along the side of the membrane electrode assembly in communication with the first reactant and is absent from the side of the membrane electrode assembly in communication with the second reactant.

In accordance with another embodiment of the present invention, the membrane electrode assembly defines a partition between the first and second reactants and comprises an anode side in communication with the first reactant and a cathode side in communication with the second reactant. The membrane reinforcement layer is bonded to the anode side of the membrane electrode assembly and is absent from the cathode side of the membrane electrode assembly.

Accordingly, it is an object of the present invention to address performance issues attributable to membrane electrode assemblies, and the components thereof, utilized in electrochemical conversion cells. Other objects of the present invention will be apparent in light of the description of the invention embodied herein.

BRIEF DESCRIPTION OF THE SEVERAL VIEWS OF THE DRAWINGS

The following detailed description of specific embodiments of the present invention can be best understood when read in conjunction with the following drawings, where like structure is indicated with like reference numerals and in which:

FIGS. 2-4 are illustrations of membrane electrode assemblies according to some particular embodiments of the present invention;

DETAILED DESCRIPTION

Figure 1:
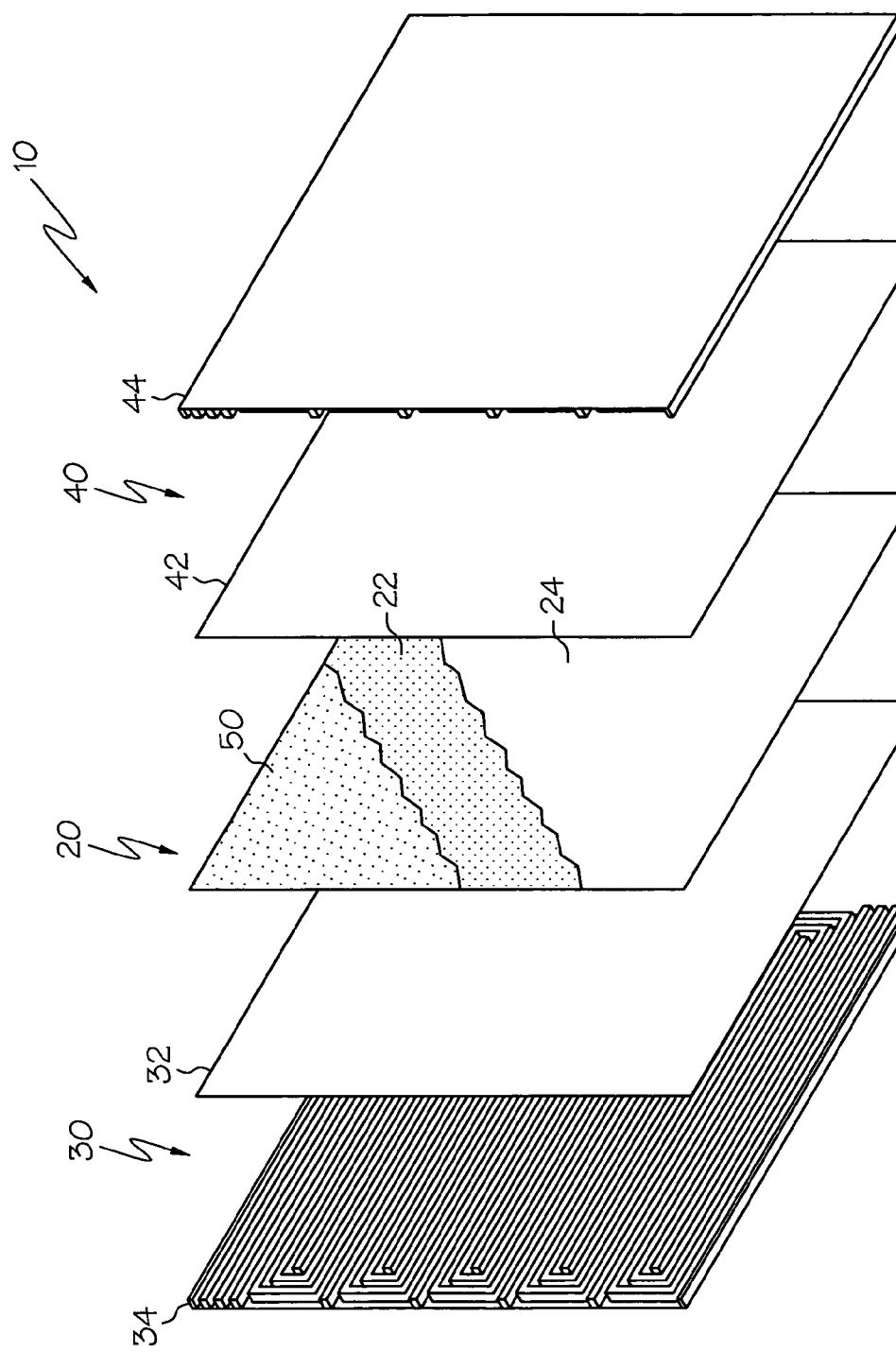
FIG. 1 is an exploded illustration of an electrochemical conversion cell according to one embodiment of the present invention.

Referring to the exploded view of FIG. 1, noting that the general construction and operation of electrochemical conversion cells are beyond the scope of the present invention and may be gleaned from any suitable source covering electrochemical conversion cells, some typical components of an electrochemical conversion cell 10 are illustrated. Specifically, and not by way of limitation, an electrochemical conversion cell 10 according to the present invention is configured to convert first and second reactants $R_1$, $R_2$, to electrical energy. The illustrated cell 10 comprises a membrane electrode assembly 20 and first and second flowfield portions 30, 40 disposed on opposite sides of the membrane electrode assembly 20.

Referring to FIG. 2, although the present invention is not limited to a particular class of membrane electrode assemblies, for the purposes of illustration, it is noted that typical membrane electrode assemblies 20 comprises a catalytic anode 22 formed on a first surface of a proton conducting polymer electrolyte membrane 24 and a catalytic cathode 26 formed on a second surface of the polymer electrolyte membrane 24. The anode 22 is in communication with the first reactant supply $R_1$ (illustrated as $H_2$ in FIGS. 2-4) while the cathode 26 is in communication with the second reactant supply $R_2$ (illustrated as $O_2$ in FIGS. 2-4). Polymer electrolyte membranes are widely used in electrochemical conversion cells because they conduct protons efficiently and possess low fuel crossover properties—defining a suitable partition between reactant supplies. They are also robust enough to be assembled into a fuel cell stack and have relatively long life. One of the most common types of polymer electrolyte membranes is NAFION®, a perfluorosulfonate ionomer membrane material available from DuPont that is widely used in electrochemical conversion cells where the first reactant $R_1$ is a hydrogenous fuel source and the second reactant $R_2$ comprises oxygen or air.

In the illustrated embodiment, the flowfield portions 30, 40 comprise gas diffusion media layers 32, 42 and respective flow field plates 34, 44. The flowfield portions 30, 40 and gas diffusion media layers 32, 42 enhance the delivery of reactants to the associated cells. As will be appreciated with those practicing the present invention, the concepts of the present invention are not limited to cell configurations including flow field portions of the nature illustrated in FIG. 1.

As is illustrated in FIGS. 1 and 2, the electrochemical conversion cell 10 comprises the membrane electrode assembly 20 and one or more membrane reinforcement layers 50. In operation, the membrane electrode assembly 20, which typically comprises the catalytic anode 22, the polymer electrolyte membrane 24, and the catalytic cathode 26 but may take any of a variety of forms, is subject to a certain degree of operational stress. The operational stress can be attributed to a variety of sources including, for example, expansion and contraction of the membrane 24 during start-up, shut-down, and other operating periods there-between. It is contemplated that this operational stress, plays a significant role in the degradation of the membrane electrode assembly 20 and, accordingly, is a significant factor in establishing the given operational degradation threshold for a particular membrane electrode assembly 20. For the purposes of defining and describing the present invention, it is noted that the operational degradation threshold of a particular membrane electrode assembly 20 represents a point beyond which the assembly 20 does not perform to a sufficient level or standard. As will be appreciated by those practicing the present invention, the particular value or magnitude of this threshold will vary widely depending upon the requirements of the particular system in which the membrane electrode assembly is employed. As such, the threshold is not described herein with specific reference to any concrete values.

In any event, the operational stress may be defined in terms of its longitudinal component oriented along a major planar dimension of the membrane electrode assembly 20. For the purposes of illustrating the present invention, it may be said that the membrane electrode assembly 20 defines a fracture toughness that is insufficient to preserve the structural integrity of the assembly 20 beyond a given operational degradation threshold under the longitudinal component of a given operational stress. The membrane reinforcement layer 50, which defines an elastic modulus and a thickness and is bonded to at least one side of the membrane electrode assembly 20 along a dimension parallel to the longitudinal component of the operational stress, is directed at enhancing the structural integrity of the membrane electrode assembly 20 beyond the given degradation threshold of the assembly 20.

Specifically, the membrane reinforcement layer 50 defines an elastic modulus and a thickness and is bonded to the membrane electrode assembly 20 with a strength that is sufficient to enhance the structural integrity of the membrane electrode assembly beyond its operational degradation threshold. Although a variety of factors affect the degree to which the membrane reinforcement layer 50 enhances the structural integrity of the membrane electrode assembly 20, in some embodiments of the present invention, it will be sufficient to ensure that the elastic modulus $E_r$ of the reinforcement layer is at least 10% of the elastic modulus $E_m$ of the membrane electrode assembly while the thickness $h_r$ of the reinforcement layer is at least 50% of the thickness h of the membrane electrode assembly. In other embodiments, it will be advantageous to ensure that elastic modulus $E_r$ of the reinforcement layer is at least as large as the elastic modulus $E_m$ of the membrane electrode assembly while the thickness $h_r$ of the reinforcement layer is at least as large as the thickness h of the membrane electrode assembly.

In still further embodiments, consideration should be given to ensuring that the bond between the membrane reinforcement layer 50 and the membrane electrode assembly 20 is of sufficient strength to ensure that any operational strain induced in the membrane electrode assembly 20 during operation is substantially equivalent to the corresponding strain in the reinforcement layer 50. In this manner, de-lamination of the reinforcement layer 50 from the membrane electrode assembly may be realized. It is contemplated that the bond between the membrane reinforcement layer 50 and the membrane electrode assembly 20 may be facilitated by an adhesive layer 60 or by the manner in which the membrane reinforcement layer is adjoined to or formed upon the membrane electrode assembly 20. For example, the reinforcement layer 50 may comprise a micro-porous layer formed on the electrode assembly 20. Similarly, the adhesive layer 60 may comprise a micro-porous layer.

To preserve the functionality of many types of electrochemical conversion cells it may often be necessary to ensure that the membrane reinforcement layer 50 comprises an electrically conductive material with a suitable degree of porosity to water vapor. For example, it is contemplated that suitable materials include, but are not limited to, materials commonly used to form conductive layers of gaseous diffusion media in electrochemical conversion cells. Gaseous diffusion media specifically designed to transport gases and water in fuel cell stacks typically comprise nonwoven papers and felts, such as CARBEL and ELAT available from W.L. Gore and Associates. Other suitable materials for the membrane reinforcement layer 50 include, but are not limited to, microporous layers or carbon/fluoropolymer dispersions, either of which examples could be coated on the gas diffusion media.

It is contemplated that a variety of suitable compositions may be employed in the adhesive layer 60 of the present invention. It is noted, however, that in many embodiments of the present invention, the adhesive layer 60 should be significantly porous and electrically conductive. For example, suitable adhesives may be selected from conductive mixtures of carbon fillers and polymer binders such as epoxides and fluoropolymers; thermoplastics such as EVA and other copolymers. The adhesion can be formed by the prebond via hot pressing, bonding during fuel cell assembly, bonding during fuel cell use, or blocking (weak hydrogen bonds) between the Carbel or micro-porous layer (MPL) and the electrode. The bond strength is such that during adhesion tests cohesive failure occurs within the MEA or the reinforced layer. The bond strength between the reinforcement layer and the MEA can be assessed using a conventional or yet to be developed peel test such as ASTM D6862 or D1876.

In the embodiment of the present invention illustrated in FIG. 2, where the membrane electrode assembly 20 defines a partition between the first and second reactants $H_2$, $O_2$ and comprises an anode side in communication with the first reactant $H_2$ and a cathode side in communication with the second reactant $O_2$, the membrane reinforcement layer 50 is bonded to the anode side of the membrane electrode assembly 20 and is absent from the cathode side of the membrane electrode assembly 20. In this manner, reinforcement of the membrane electrode assembly 20 may be achieved without substantial degradation of the catalytic processes at the cathode side of the membrane electrode assembly 20, which is more susceptible than the anode side to performance degradation due to the presence of the reinforcement layer 50. Alternatively, as is illustrated in FIG. 3, respective membrane reinforcement layers 50 can be bonded to both sides of the membrane electrode assembly 20. It is further contemplated that, in the context of certain reactants or specific membrane electrode assembly materials, it may be preferable to bond a membrane reinforcement layer solely to the cathode side of the assembly 20.

Referring now to FIG. 4, it is contemplated that the respective layers of gaseous diffusion media 32, 42 interposed between the first and second reactants H$_2$, O$_2$ and the membrane electrode assembly 20 can function as the respective membrane reinforcement layers, provided the bond between the respective layers of gaseous diffusion media 32, 42 and the membrane electrode assembly 20 is sufficient to enhance the structural integrity of the membrane electrode assembly 20 in the manner describe above. As is noted above, this bond may be facilitated by providing an adhesive layer 60 or through the manner in which the diffusion media layers 32, 42 are adjoined to or formed upon the membrane electrode assembly 20.

Figure 5:
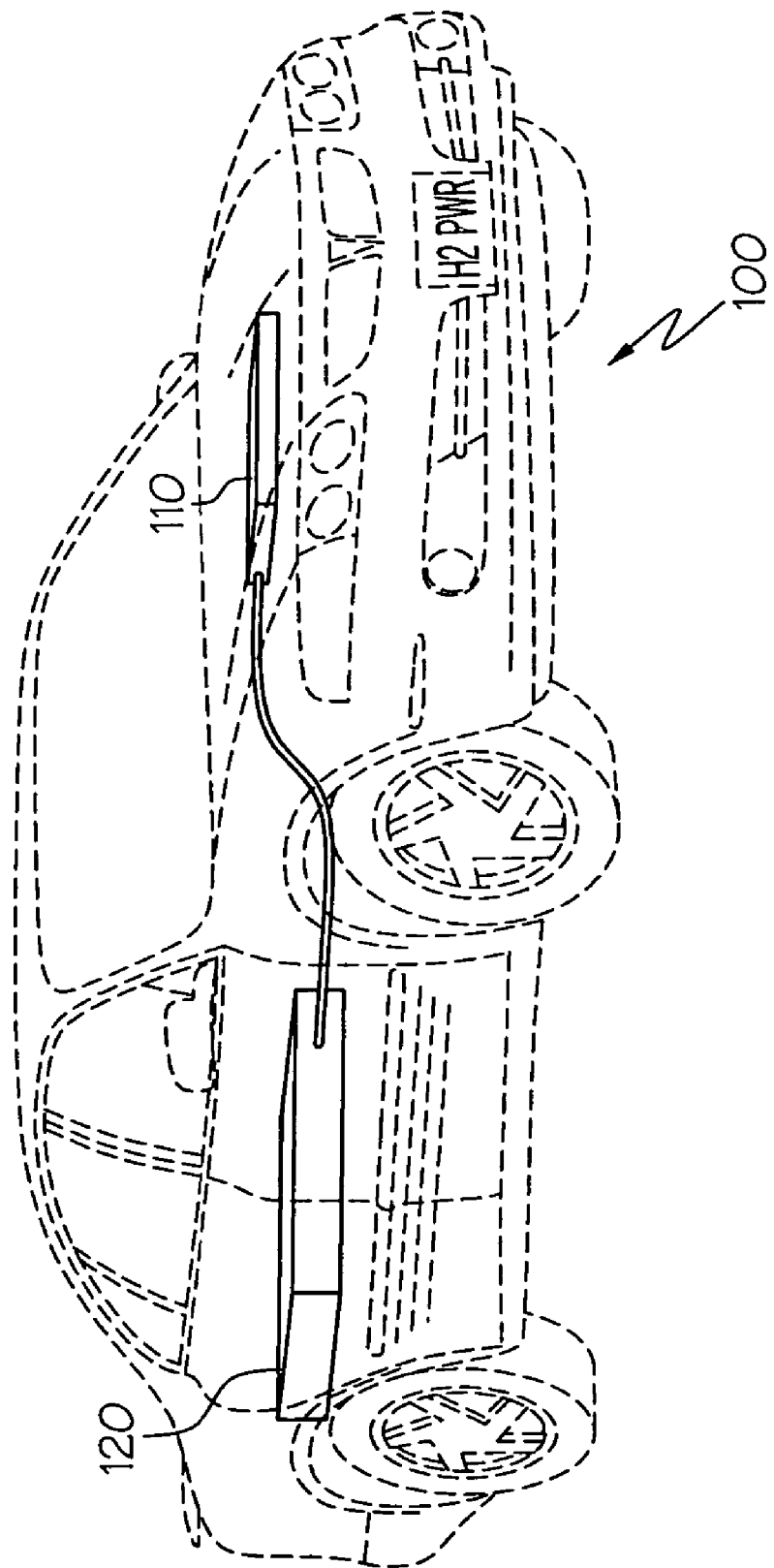
FIG. 5 is an illustration of a vehicle incorporating an electrochemical conversion cell according to the present invention.
Figure 6:
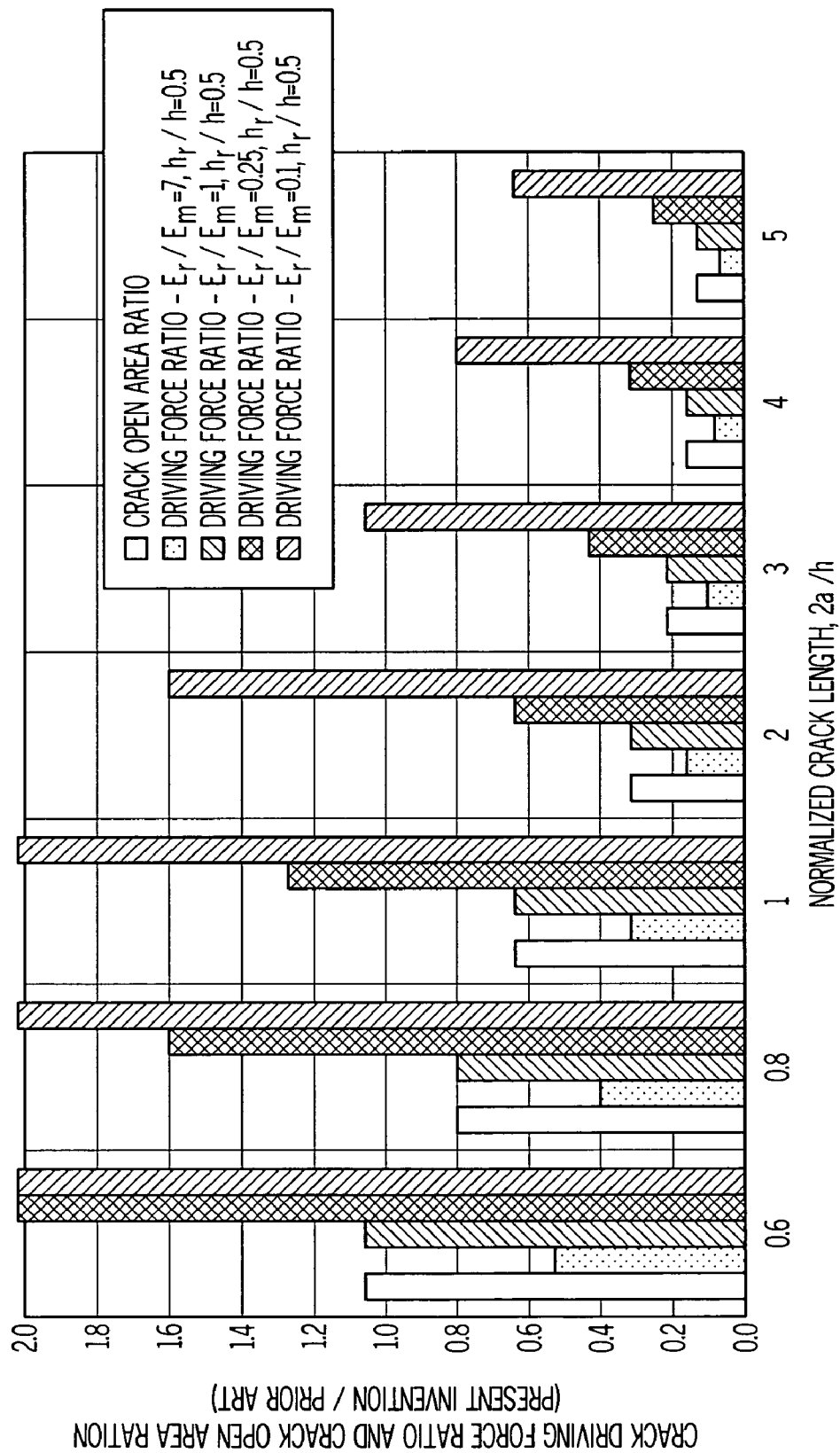
FIG. 6 is a graph illustrating the crack driving force ratio and crack open area ratio for a membrane electrode assembly with reinforcement layer on both sides of the assembly.

Referring to FIG. 5, a device according to the present invention may comprise a vehicle 100 and an electrochemical conversion assembly 110 according to the present invention. The electrochemical conversion assembly 110 can be configured to at least partially provide the vehicle 100 with motive power. The vehicle 100 may also have a fuel processing system or fuel source 120 configured to supply the electrochemical conversion assembly 110 with fuel.

Although the present invention is not limited to any specific reactant compositions, it will be appreciated by those practicing the present invention and generally familiar with fuel cell technology that the first reactant supply R$_1$ typically comprises oxygen and nitrogen while the second reactant supply R$_2$ comprises a hydrogenous gas like hydrogen or methane.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. Further, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims, where the claim term "wherein" is utilized in the open-ended sense. More specifically, although some aspects of the present invention are identified herein as preferred or particularly advantageous, it is contemplated that the present invention is not necessarily limited to these preferred aspects of the invention.

The invention claimed is:

1. A device comprising at least one electrochemical conversion cell configured to convert first and second reactants to electrical energy, said electrochemical conversion cell comprising a membrane electrode assembly and at least one external membrane reinforcement layer, wherein:

said membrane electrode assembly is subject to a degree of operational stress during operation of said electrochemical conversion cell, said operational stress having a longitudinal component oriented along a major planar dimension of said membrane electrode assembly;

said membrane electrode assembly defines a fracture toughness that is insufficient to preserve the structural integrity of said membrane electrode assembly beyond a given operational degradation threshold under said longitudinal component of said operational stress;

said external membrane reinforcement layer defines an elastic modulus $E_r$ and a thickness $h_r$ and is bonded to at least one side of said membrane electrode assembly along a dimension parallel to said longitudinal component of said operational stress; and said elastic modulus $E_r$ and said thickness $h_r$ of said external membrane reinforcement layer and said bond between said external membrane reinforcement layer and said membrane electrode assembly are sufficient to enhance said structural integrity of said membrane electrode assembly beyond said operational degradation threshold.

2. A device as claimed in claim 1 wherein said external membrane reinforcement layer is selected such that said membrane electrode assembly is characterized by crack driving forces G that are independent of crack length a as follows:

$$G = Zh\sigma^2/E_m$$

where Z is a constant representing the relative elastic modulus of the membrane electrode assembly and the external reinforcement layer, h is the membrane electrode assembly thickness, $\sigma$ is the membrane electrode assembly bi-axial tension, and $E_m$ is the elastic modulus of the membrane electrode assembly.

3. A device as claimed in claim 1 wherein said external membrane reinforcement layer is selected such that it defines an elastic modulus $E_r$ that is at least as large as the elastic modulus $E_m$ of the membrane electrode assembly while the thickness $h_r$ of the reinforcement layer is at least as large as the thickness h of the membrane electrode assembly.

4. A device as claimed in claim 1 wherein said external membrane reinforcement layer is selected such that said membrane electrode assembly is characterized by a crack driving force that is independent of crack length and a crack open area that is merely proportional to crack length a and not the square of crack length a.

5. A device as claimed in claim 1 wherein said elastic modulus $E_r$ of said external membrane reinforcement layer is at least 10% of said elastic modulus $E_m$ of said membrane electrode assembly.

6. A device as claimed in claim 1 wherein said thickness $h_r$ of said external membrane reinforcement layer is at least 50% of said thickness h of said membrane electrode assembly.

7. A device as claimed in claim 1 wherein said elastic modulus $E_r$ of said external membrane reinforcement layer is at least as large as said elastic modulus $E_m$ of said membrane electrode assembly.

8. A device as claimed in claim 1 wherein said thickness $h_r$ of said external membrane reinforcement layer is at least as large as said thickness h of said membrane electrode assembly.

9. A device as claimed in claim 1 wherein:

said first reactant comprises a hydrogenous gas;

said second reactant comprises oxygen;

said membrane electrode assembly defines a partition between said first and second reactants; and said external membrane reinforcement layer is bonded to a side of said membrane electrode assembly in communication with said first reactant and is absent from a side of said membrane electrode assembly in communication with said second reactant.

10. A device as claimed in claim 1 wherein:
said membrane electrode assembly defines a partition between said first and second reactants; and
said external membrane reinforcement layer is bonded to both sides of said membrane electrode assembly.

11. A device as claimed in claim 1 wherein:
said membrane electrode assembly defines a partition between said first and second reactants; and
said external membrane reinforcement layer is bonded to only one side of said membrane electrode assembly.

12. A device as claimed in claim 1 wherein said external membrane reinforcement layer comprises an electrically conductive material.

13. A device as claimed in claim 1 wherein:
said electrochemical conversion cell comprises respective layers of gaseous diffusion media interposed between sources of said first and second reactants and said membrane electrode assembly; and
said external membrane reinforcement layer comprises one of said respective layers of gaseous diffusion media.

14. A device as claimed in claim 1 wherein said bond between said external membrane reinforcement layer and said membrane electrode assembly is of sufficient strength to ensure that said strain induced in said membrane electrode assembly is substantially equivalent to strain in said external membrane reinforcement layer.

15. A device as claimed in claim 1 wherein said bond between said external membrane reinforcement layer and said membrane electrode assembly is facilitated by an adhesive layer.

16. A device as claimed in claim 1 wherein:
said membrane electrode assembly comprises first and second catalytic electrodes formed on opposite sides of a polymer electrolyte membrane configured to conduct protons;
said first catalytic electrode is in communication with a first reactant supply; and
said second catalytic electrode is in communication with a second reactant supply.

17. A device as claimed in claim 1 wherein said electrochemical conversion assembly further comprises a first and second flowfield portions disposed on opposite sides of said membrane electrode assembly, said first flowfield portion in communication with a first reactant supply and said second flowfield portion in communication with said second reactant supply.

18. A device as claimed in claim 1 wherein said device further comprises a vehicle and said electrochemical conversion cell serves as a source of motive power for said vehicle.

* * * * *